H. C. MARTIN

July 22, 1930.

METHOD OF MAKING ABRASIVE DISKS

Original Filed March 5, 1920

Re. 17,739

INVENTOR

Harry C. Martin by Byrnes, Stettinius, Burgess & Parmelee his Attorneys

Reissued July 22, 1930

Re. 17,739

UNITED STATES PATENT OFFICE

HARRY C. MARTIN, OF NIAGARA FALLS, NEW YORK, ASSIGNOR TO THE CARBORUNDUM COMPANY, OF NIAGARA FALLS, NEW YORK, A CORPORATION OF PENNSYLVANIA

METHOD OF MAKING ABRASIVE DISKS

Original application filed March 5, 1920, Serial No. 363,480. Continued and application filed January 25, 1922, Serial No. 531,554. Original No. 1,567,071, dated December 29, 1925. Application for reissue filed October 29, 1927. Serial No. 229,751.

DIVISION A

Figure 1:
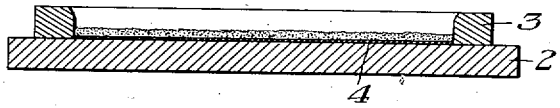
Figure 2:
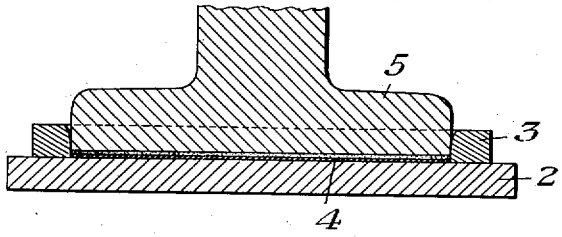
Figure 3:
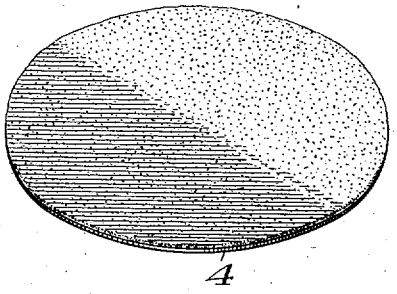

Figures 1 and 2 are sectional views of mold devices and illustrating steps in the manufacture of the abrading disks; and Figure 3 is a perspective view of a finished disk embodying my invention.

This application is a continuation of my application, Serial No. 363,480, filed March 5, 1920.

My invention relates to an improvement in the method of manufacturing abrasive disks, these disks being of the character used on machines known as "disk grinders", for grinding flat surfaces on metals and other materials. Such disks usually consist of a paper or cloth backing or body coated with a thin layer of abrasive by means of glue after the ordinary manner of sand paper and emery cloth. Their use is limited by the fact that the coating is relatively thin, and they do not possess very much durability when called upon to do heavy work. Their usefulness is also to a large degree conditioned upon the degree of porosity of the abrasive, the porosity being the measure of the free cutting properties of the material. This is due to the fact that the degree of porosity controls freedom from glazing in use; or in other words, the free cutting properties of the disk depend upon the extent to which the material ground off is kept from lodging in the pores of the cutting surfaces.

I have discovered that a very efficient abrasive disk can be made by building up an abrasive body consisting of abrasive grains bonded together by a resinous cement, preferably of shellac, upon a backing of cloth or paper.

In the practice of my invention, for example in the making of a shellac disk, I employ a shallow circular mold consisting of an iron bottom plate 2 and an iron ring 3 of the proper diameter required for the disk. In this mold, I place a disk 4 of cloth or paper and spread over this a thin layer from three-sixteenths of an inch to three-fourths of an inch thick or abrasive grains mixed with powdered shellac, preferably in approximately the proportions by weight of ninety-two parts abrasive grains and eight parts powered shellac, although the exact proportions may be varied somewhat to meet the characteristics desired in the particular disk being manufactured. The shellac should, in general, not exceed nine or ten percent of the mix, as shellac in excess of this makes the disk too hard and dense.

The mold with its contents is then placed in the melting oven and brought up to a temperature sufficient to bring the shellac to a molten or plastic condition. The mold is then taken from the oven and a circular iron plunger, such as illustrated at 5 in Figure 2, is inserted in the ring 3 upon the abrasive material, and the latter is subjected to pressure of three hundred to five hundred pounds, per square inch, which compresses and agglomerates it. Increasing the proportion of shellac and the pressure increases hardness and decreases the porosity of the disk. I have used in practice from eight to ten percent of shellac and have varied the agglomerating pressure from three hundred to five hundred pounds, per square inch, to meet the variations in hardness that are required. The disk is then removed from the mold and allowed to cool, after which it is baked in an oven at a temperature, preferably of from two hundred and ninety to three hundred degrees Fahrenheit.

If the baking temperature does not exceed three hundred degrees Fahrenheit, the paper or cloth backing is not destroyed and is available for the purpose of forming an intermediate layer between the disk and the plate upon which the disk is fastened, when put into actual use.

As a modification of the above described method, I may, however, bake at a temperature of three hundred and fifty degrees Fahrenheit. This temperature destroys the backing, but toughens and improves the abrasive. I then take a fresh piece of backing material and shellac it on to the abrasive disk by means of freshly melted shellac. In this manner, I obtain a combination of the shellac body and backing in as good a working condition as if the backing was originally incorporated with the shellac body.

It will be understood that the backing serves two functions, viz., it acts as a means of holding and carrying the disk body in its first melted condition and to strengthen the same until it is transferred to the baking operation, where it is toughened until it no longer needs such reinforcement. The second function is to form an intermediate layer between the disk and plate, as above stated. Both these functions may be performed by the modification above described, as well as by the first described method.

I have found that disks made in accordance with my invention, using ordinary artificial aluminous abrasives in grits from No. 16 to No. 36, will weigh from 1.9 to 2.3 grams per cubic centimeter. The apparent density of two grams per cubic centimeter gives a very good cutting efficiency, and the disk does not glaze up with the material being ground, but maintains a very good cutting surface. With apparent densities of from 1.9 to 2.3 grams per cubic centimeter, the equivalent porosity varies from 47 to 36 percent; and it is important that the porosity should not be less than 36 percent, in order to give the free cutting properties above described.

An ordinary shellac bound grinding wheel made up according to the methods heretofore in use with grits of these sizes and grades, has an apparent density of from 2.4 to 2.6 grams per cubic centimeter, and if used in the same cutting operation would very quickly glaze and show very poor cutting efficiency.

In making such grinding wheels the amount of shellac and the agglomerating pressure greatly exceed that employed in making my grinding disks.

In addition to the increased porosity, the disks made in accordance with my invention have a uniform texture throughout so that they will remain efficient during their life. They also possess the advantage that they do not crack or chip at the edges. They may be used either wet or dry, which is not true of a glue disk. The disks may be made of any desired grade of hardness to suit the particular work in which they are to be used.

While the disks have sufficient porosity to prevent glazing, they have sufficient strength and density to stand up under hard usage, and have a durability and cutting efficiency much greater than disks made of abrasive material not compressed. The disks may also be built up to any thickness desired, which is not practical in making disks in which abrasive is sprinkled on to the adhesive. The shellac gives a good tensile bond, and the disks are capable of operating more safely and under higher peripheral speeds than disks having weaker bonding materials, such for example, as magnesia cement. The abrasive composition of the disks is considerably more porous, and hence, structurally not as strong as the more dense shellac bound abrasive wheels containing a greater percentage of shellac and made with a higher agglomerating pressure. However, the cloth backing of my disks supplies an added tensile strength, so that the composite disks are capable of safely operating at the high peripheral speeds now used in disk grinding. The disks, therefore, combine high enough porosity to prevent glazing, sufficient thickness, strength of bond and density to have great durability, and the necessary tensile strength for high speed grinding machinery.

While I have described in detail the preferred embodiment of my abrasive disk and its process of manufacture, it is to be understood that the invention is not limited to all of the described details, but may be otherwise embodied within the scope of the following claims.

I claim:

1. The herein described method of making abrasive disks which consists in mixing abrasive grains with shellac in the approximate proportions of 9 to 1 parts, spreading the same in a suitable mold upon a backing, placing the mold in a melting oven and bringing its contents to a temperature sufficient to soften the shellac, then applying a pressure to the abrasive material sufficient to agglomerate it but not to reduce the porosity of the finished disk below about 36%, and then baking the article so formed, substantially as described.

2. The herein described method of making abrasive disks which consists in mixing abrasive grains with shellac as a bonding agent, the shellac forming about 8 or 9% of the mix, spreading the same in a suitable mold upon a backing, placing the mold in a melting oven and bringing its contents to a temperature sufficient to soften the shellac, then applying a pressure of not over 500 pounds per square inch to the abrasive material to compress and agglomerate it, and then baking the article so formed, substantially as described.

3. The herein described method of making abrasive disks which consists in mixing abrasive grains with a resinous bonding material, the resinous bonding material forming not over 10% of the mix, spreading the same in a suitable mold upon a backing, placing the mold in a melting oven and bringing it with its contents to a temperature sufficient to soften the resinous bonding material, then applying pressure to the mix to compress and agglomerate it, and then baking the article so formed, substantially as described.

4. The herein described method of making abrasive disks which consists in mixing abrasive grains with shellac, the shellac forming not over ten percent of the mix, spreading the same in a suitable mold upon a backing, placing the mold in a melting oven and bringing it with its contents to a temperature sufficient to soften the shellac, then applying an agglomerating pressure to the abrasive material to give it the required density, and then baking the article so formed, substantially as described.

5. The herein described method of making abrasive disks which consists in mixing abrasive grains with a resinous bonding material, spreading the same in a suitable mold upon a flexible backing, placing the mold in a melting oven and bringing it with its contents to a temperature sufficient to soften the bonding material, then applying an agglomerating pressure of not over 500 pounds per square inch to the abrasive material to give it the required density, and then baking the article so formed, substantially as described.

6. The herein described method of making abrasive disks which consists in mixing abrasive grains with a resinous bonding material, spreading the same in a suitable mold upon a flexible backing, placing the mold in a melting oven and bringing it with its contents to a temperature sufficient to soften the bonding material, then applying an agglomerating pressure to the abrasive material and then baking the article so formed, the abrasive grains and the bonding material being so proportioned and the agglomerating pressure being so limited as to give the finished disk a porosity not less than about 36%, substantially as described.

7. The herein described method of making abrasive disks, which consists in mixing abrasive grains with a resinous bonding material, spreading the same in a suitable mold upon a backing and applying an agglomerating pressure to shape the disk, and then baking the disk so formed, the abrasive grains and the bonding material being so proportioned and the agglomerating pressure being so limited as to give the abrading portion of the disk an apparent density of not over about 2.3 grams per cubic centimeter.

8. The herein described method of making abrasive disks, which consists in mixing abrasive grains with a resinous bonding material, spreading the same in a suitable mold upon a backing, placing the mold in a melting oven and bringing it with its contents to a temperature sufficient to soften the bonding material, and then applying an agglomerating pressure to the abrasive material and then baking the article so formed, the abrasive grains and the bonding material being so proportioned and the agglomerating pressure being so limited as to produce a finished disk having an abrading portion of an apparent density of about 1.9 to 2.3 grams per cubic centimeter.

9. The herein described method of making abrasive disks, which consists in molding a mix of abrasive grains and a resinous bonding agent into disk form and baking it, the material being so molded that the abrading portion of the finished disk has an apparent density of not over about 2.3 grams per cubic centimeter with a porosity of not less than 36%.

10. The herein described method of making abrasive disks, which consists in mixing abrasive grains with a resinous bonding material, spreading the mix in a suitable mold and heating the mix to soften the bonding material, applying an agglomerating pressure to the abrasive material and baking the article so formed and applying a backing thereto, the abrasive grains and the bonding material being so proportioned and the agglomerating pressure being so limited as to give the abrasive portion of the disk an apparent density of not over about 2.3 grams per cubic centimeter.

In testimony whereof I have hereunto set my hand.

HARRY C. MARTIN.